US008270453B2

(12) United States Patent
Khayrallah et al.

(10) Patent No.: US 8,270,453 B2
(45) Date of Patent: Sep. 18, 2012

(54) SYSTEM AND METHOD FOR PARALLEL INTERFERENCE CANCELLATION WITH COVARIANCE ROOT PROCESSING

(75) Inventors: Ali S. Khayrallah, Cary, NC (US); Carmela Cozzo, Cary, NC (US); Tracy Fulghum, Durham, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 978 days.

(21) Appl. No.: 12/263,712

(22) Filed: Nov. 3, 2008

(65) Prior Publication Data

US 2010/0111239 A1    May 6, 2010

(51) Int. Cl.
*H04B 1/00* (2006.01)
(52) U.S. Cl. ......... 375/130; 375/142; 375/147; 375/148
(58) Field of Classification Search .................. 375/130, 375/135, 136, 140, 142, 143, 144, 146, 147, 375/148, 150, 152, 240.26–240.29, 278, 375/284, 285, 295, 316, 326, 324, 346
See application file for complete search history.

(56) References Cited

U.S. PATENT DOCUMENTS

| | | | |
|---|---|---|---|
| 2003/0031236 A1* | 2/2003 | Dahlman et al. | 375/147 |
| 2007/0116099 A1 | 5/2007 | Banister | |
| 2007/0263704 A1* | 11/2007 | Nagarajan et al. | 375/148 |
| 2008/0063033 A1* | 3/2008 | Khayrallah | 375/148 |
| 2009/0196333 A1* | 8/2009 | Cozzo | 375/225 |

OTHER PUBLICATIONS

B. Hagerman, F. Gunnarsson, H. Murai, M. Tadenuma, and J. Karlsson, entitled "WCDMA Uplink Parallel Interference Cancellation—System Simulations and Prototype Field Trials," published in the EURASIP Journal on Applied Signal Processing, 2005:11, pp. 1725-1735.
G. E. Bottomley, T. Ottosson, and Y. P. E. Wang, "A generalized RAKE receiver for interference suppression," published in the IEEE J. Select. Areas Commun., vol. 18, pp. 1536-1545, Aug. 2000.
M. Seeger, "Low rank updates for the Cholesky decomposition," published by the Department of EECS, UC Berkeley, 2005.

\* cited by examiner

*Primary Examiner* — Sam K Ahn
*Assistant Examiner* — Linda Wong

(57) ABSTRACT

A parallel interference cancellation (PIC) receiver incrementally removes interference from signals in parallel modules in successive stages. For each desired signal, as interfering signals are removed, corresponding updates to a data covariance matrix are modeled as computationally tractable rank-one updates to a root matrix of the covariance matrix. Processing of signals and/or covariance information may be initiated, continued, and/or halted at various stages, e.g., in response to signal or data quality. The PIC receiver using root matrix updates is applicable to a variety of demodulation techniques.

21 Claims, 7 Drawing Sheets

SYSTEM AND METHOD FOR PARALLEL INTERFERENCE CANCELLATION WITH COVARIANCE ROOT PROCESSING

FIELD OF THE INVENTION

The present invention relates generally to wireless communication receivers, and in particular to a receiver performing parallel interference cancellation using a computationally tractable root matrix of a data covariance matrix in lieu of the data covariance matrix itself.

BACKGROUND

Parallel Interference Cancellation is a known technique for cancelling interference from received wireless communication signals. For example, the technique has been suggested for the WCDMA uplink, in a paper by B. Hagerman, F. Gunnarsson, H. Murai, M. Tadenuma, and J. Karlsson, entitled "WCDMA Uplink Parallel Interference Cancellation—System Simulations and Prototype Field Trials," published in the EURASIP Journal on Applied Signal Processing, 2005:11, pp. 1725-1735, which is incorporated herein in its entirety. PIC showed good performance in the WCDMA Uplink application, which is characterized by a homogeneous set of speech users. With High Speed Packet Access (HSPA), the mix of users can be highly heterogeneous, ranging from very low rate messaging to very high rate data users. PIC may be well suited for such a heterogeneous mix as well.

Consider a wireless communication receiver, receiving J signals (1, . . . , J) arriving simultaneously, and interfering with one another. An ideal receiver demodulates the J signals jointly; however, such a receiver cannot be realized in practice due to the enormous computational complexity of the task. A PIC structure is a practical way to approach the performance of a joint demodulator.

A PIC system receives the joint signals, comprising time samples from one or more receive antennas, and an interference data covariance matrix representing covariance properties between samples from different time delays and/or from different antennas. The PIC system incrementally cancels interference, isolating signals and improving the signal quality in successive stages. Each downstream stage performs better signal reconstruction than prior stages, as it starts with the improved signal from a prior stage, and in turn provides its results to a later stage for still better improvement. Each stage comprises one or more parallel modules, each module dedicated to isolating and reconstructing one of the J received communication signals. Within each module, all other J−1 signals are considered interference, and are cancelled out of the receiver input. As signals are cancelled out, the interference data covariance matrix must be updated correspondingly, to remove the covariance information associated with the cancelled signals. Updating the covariance matrix is a computationally demanding operation, which may limit the size and speed of the PIC system, thus limiting receiver performance.

SUMMARY

According to one or more embodiments disclosed herein, a parallel interference cancellation (PIC) receiver operates using the root matrix of the data covariance matrix. The data covariance matrix itself need not be computed or updated. The data covariance root matrix has a triangular structure, which simplifies many computations. In particular, linear systems can be solved by back-substitution. In one or more embodiments, the update of the data covariance matrix to account for the cancellation of a user is replaced by an update to its data covariance root matrix. The exact update of the data covariance matrix—a computationally complex calculation—is replaced with one of several approximations that are compatible with updating the corresponding data covariance root matrix. In particular, a rank-one update to the data covariance matrix is employed, whereby the corresponding data covariance root matrix update is simplified.

One embodiment relates to a method of parallel interference cancellation. A total received signal comprising time samples from one or more receive antennas and an interference data covariance matrix representing covariance properties between samples from different time delays and/or from different antennas are received. The root matrix of the covariance matrix and a scalar value are calculated. In each of a series of successive stages, a total reconstructed signal and channel estimates are calculated, based on the total received signal, data covariance root matrix, and scalar, and, except for the first stage, the total reconstructed signal and channel estimates from the prior stage. Each stage comprises one or more parallel modules, each operative to reconstruct an individual signal and channel estimate for a different individual signal in the total received signal, based on the demodulation and channel estimation of all received signals provided by the immediately prior stage.

Another embodiment relates to a parallel interference cancellation system receiving a total received signal r comprising time samples from one or more receive antennas and a data covariance matrix $R_d$ representing covariance properties between samples from different time delays and/or from different antennas, the system operative to cancel interference in one or more individual signals r(j). The system includes a series of k successive stages, the i-th stage calculating a reconstructed total signal $r^i$ and channel estimates $h^i$ based on r, the data covariance root matrix M of $R_d$, a scalar value $\alpha$, and, except for the first stage, $r^{i-1}$ and $h^{i-1}$. Each stage i comprises j parallel modules, each operative to reconstruct an individual signal $r^i(j)$ and channel estimate $h^i(j)$ for a different individual signal in r, based on r, M, $\alpha$, $r^{i-1}$, and $h^{i-1}$. The i-th stage outputs $r^i$ and $h^i$ comprise the sum of $r^i(j)$ and $h^i(j)$ from all j modules.

DETAILED DESCRIPTION

Overview of Parallel Interference Cancellation

Figure 5:
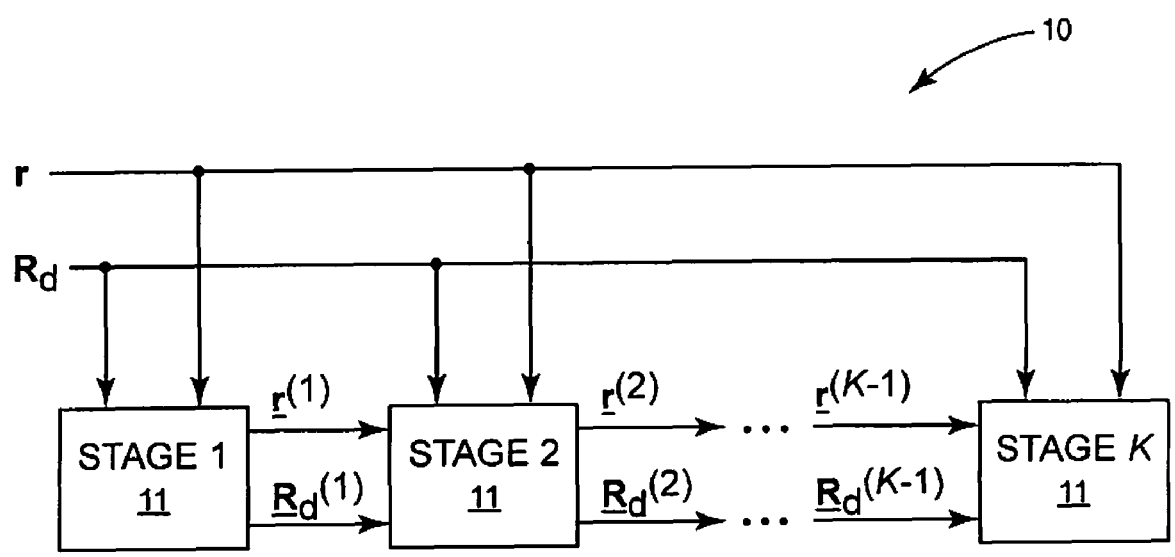
FIG. 5 is a functional block diagram of a prior art PIC system.
Figure 6:
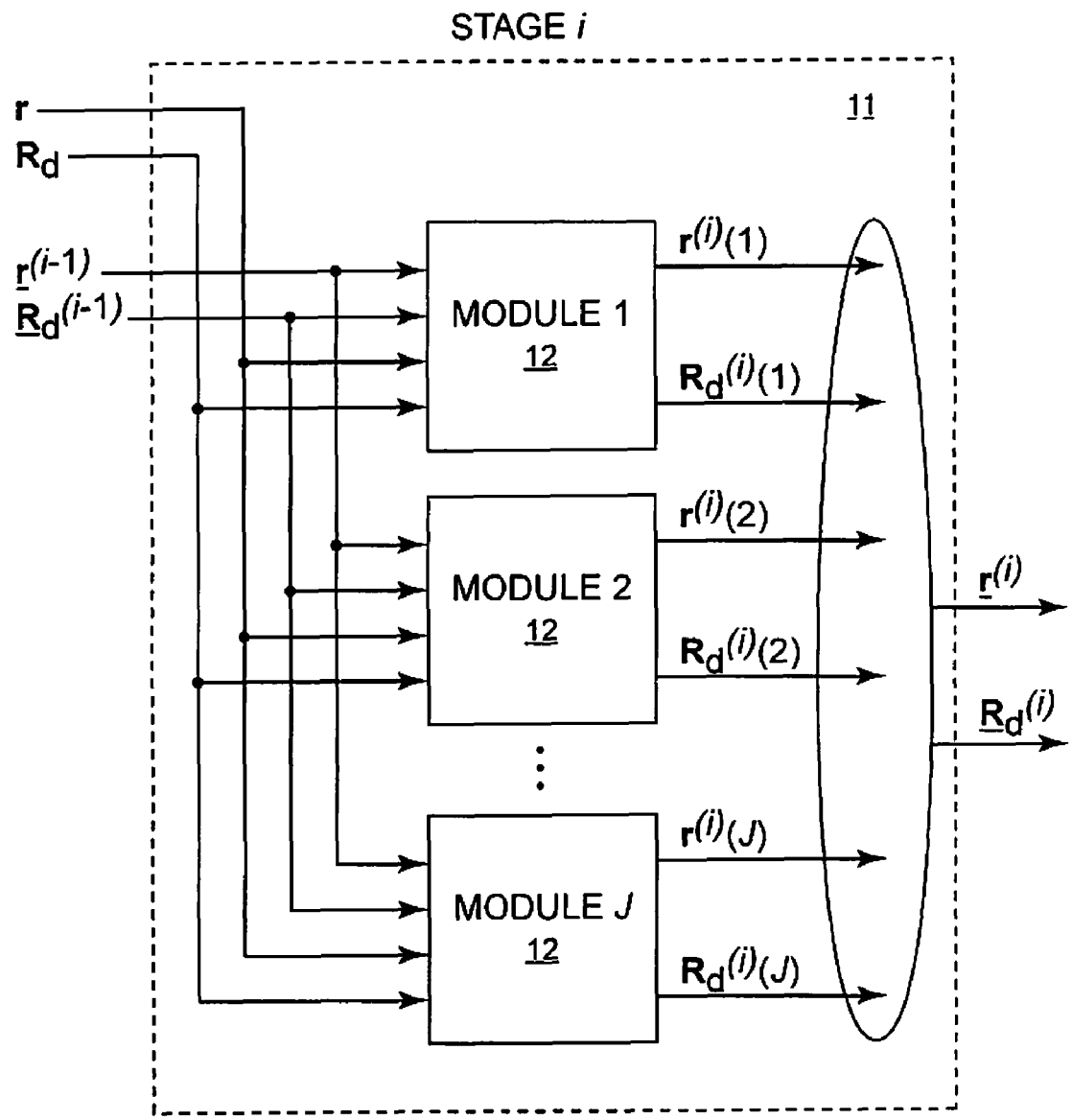
FIG. 6 is a functional block diagram of a prior art PIC stage.
Figure 7:
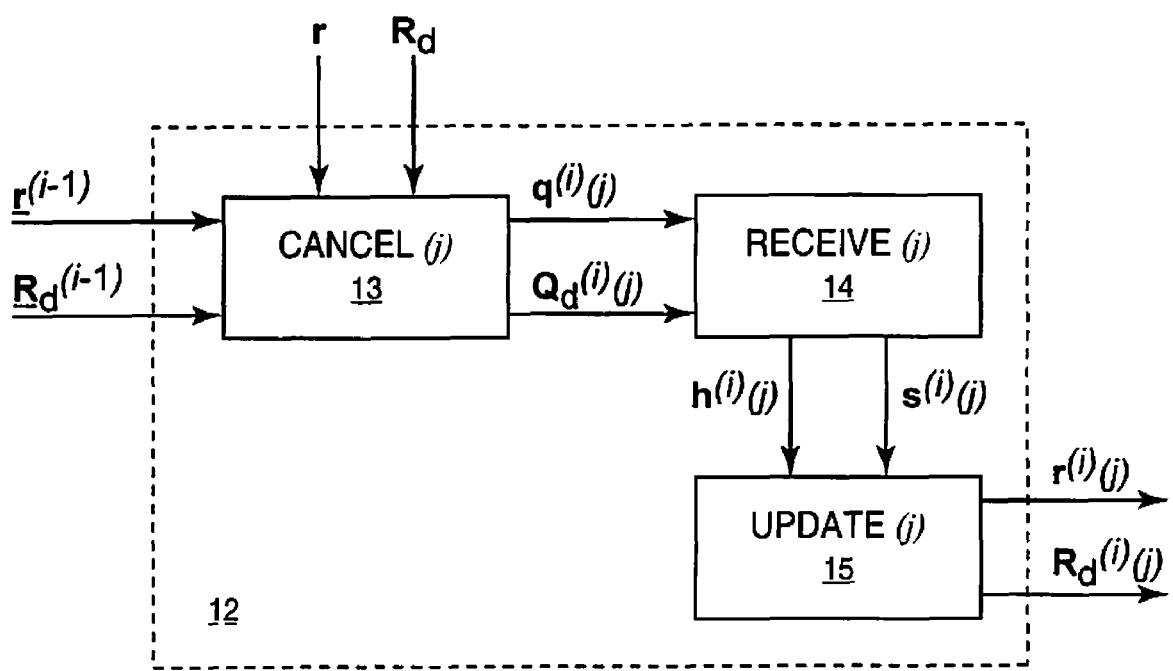
FIG. 7 is a functional block diagram of a prior art PIC module.

A conventional Parallel Interference Cancellation (PIC) system 10 is depicted in FIGS. 5-7. As best seen in FIG. 5, the PIC system 10 comprises K successive stages 11. The total received communication signal r, comprising time samples of J received signals, which may be received at one or more antennas, and an interference data covariance matrix $R_d$, representing covariance properties between samples from different time delays and/or from different antennas, are distributed to all K stages 11. Each stage i (other than the first) also accepts the reconstructed signals $r^{i-1}$ and updated covariance matrix $R_d^{i-1}$ from the previous stage 11. The i-th stage 11 generates an improved signal $r^i$ and data covariance matrix $R_d^i$ for use by the next stage 11.

FIG. 6 depicts the structure of stage i. Stage i accepts r and $R_d$. By default, stage contains J modules 12. Note that there is no interaction among modules 12 of the same stage 11, in keeping with the parallel processing idea central to PIC. Stage i also accepts information from stage (i−1), in the form of reconstructed signals and their corresponding covariances. Each individual module 12 in stage i will exploit this information in demodulating its desired signal. In turn, stage i produces reconstructed signals and their corresponding data covadance matrices to help stage (i+1).

The reconstructed version of signal j at stage i is denoted $r^{(i)}(j)$, and its corresponding data covariance matrix is denoted $R_d^{(i)}(j)$. Their computation is explained in the description of the individual module 12 below. In addition, the group of J reconstructed signals is denoted $\overline{r}^{(i)}$, and the group of corresponding data covariances is denoted $\overline{R}_d^{(i)}$. In summary, stage i accepts r, $R_d$, $\overline{r}^{(i-1)}$ and $\overline{R}_d^{(i-1)}$, and produces $\overline{r}^{(i)}$ and $\overline{R}_d^{(i)}$.

FIG. 7 depicts module j at stage i, which demodulates signal j with the help of information from stage (i−1), and produces information to help stage (i+1). By default, the module 12 contains a cancellation block 13, a receiver block 14, and an update block 15. The module 12 accepts r, $R_d$, $\overline{r}^{(i-1)}$, and $\overline{R}_d^{(i-1)}$.

A cancellation set $T^{(i)}(j)$ contains the signals to be cancelled. By default, it contains all the signals in r except j. In the cancellation block 13, the received signal is improved by removing reconstructed signals from the previous stage 11:

$$q^{(i)}(j) = r - \sum_{j' \in T^{(i)}(j)} r^{(i-1)}(j') \tag{1}$$

The corresponding data covariance matrix is given by $$Q_d^{(i)}(j) = R_d - \sum_{j' \in T^{(i)}(j)} \alpha(j') R_d^{(i-1)}(j') \tag{2}$$

The receiver block 14 accepts the improved signal $q^{(i)}(j)$ and its covariance information $Q_d^{(i)}(j)$. By default, it first computes channel estimates $h^{(i)}(j)$, using a standard method exploiting the pilot channel. The receiver block 14 then finds a Generalized RAKE (GRAKE) weight solution, and uses it to demodulate the symbols $s^{(i)}(j)$. The GRAKE receiver is described in a paper by G. E. Bottomley, T. Ottosson, and Y. P. E. Wang, "A generalized RAKE receiver for interference suppression," published in the IEEE J. Select. Areas Commun., vol. 18, pp. 1536-1545, August 2000, and incorporated herein by reference in its entirety.

In the update block 15, the signal is reconstructed using the information from the receiver block 14:

$$r^{(i)}(j) = h^{(i)}(j) * s_c^{(i)}(j) \tag{3}$$

where $s_c^{(i)}(j)$ is the re-spread version of the symbols $s^{(i)}(j)$, and * indicates convolution.

As noted in U.S. patent application Ser. No. 12/103,145 by Kahyrallah, et al., titled "Method and Apparatus for Successive Interference Subtraction with Covariance Root Processing," filed Apr. 15, 2008, and incorporated herein in its entirety ("the '145 application"), the exact expression of the data covariance matrix $R_d^{(i)}(j)$ corresponding to $r^{(i)}(j)$ is difficult to compute. As discussed in the '145 application, a first order approximation of $R_d^{(i)}(j)$ is the outer product:

$$R_d^{(i)}(j) = \alpha(j) h^{(i)}(j) h^{(i)}(j)^H \tag{4}$$

where the scaling parameter $\alpha(j)$ absorbs any required adjustment, such as accounting for the expected value of the modulation symbols. The loss of performance due to the approximation is minimal. By not accounting fully in the data covariance matrix (eq. 2) for a signal that has been removed (eq. 1), only some of the cancellation capability is wasted on an absent signal.

U.S. patent application Ser. No. 11/470,676, filed Sep. 7, 2006, published on Mar. 13, 2008 as 2008/0063033, entitled "Method for Cova dance Matrix Update," and U.S. patent application Ser. No. 12/130,145, filed Apr. 15, 2008, entitled "Method for Successive Interference Subtraction with Covariance Root Processing," contain additional information regarding PIC processing and covariance matrix manipulation. Both applications are incorporated herein by reference in their entirety.

Root Matrix and Rank-One Update

The root matrix is known in the mathematical arts. Given a positive definite matrix R, the Cholesky decomposition produces a matrix M that satisfies:

$$R = MM^H \tag{5}$$

The matrix M can be interpreted as the "square root" of R. It is a lower triangular matrix with real positive elements on the diagonal. The Cholesky decomposition is denoted as a function CD with input R and output M:

$$M = CD(R) \tag{6}$$

The Cholesky decomposition has been studied extensively, and many uses of the square root matrix are known in the art. See, for example, chapter 4 of G. H Golub and C. F. Van Loan, "Matrix computations," third edition, The John Hopkins University Press, incorporated herein by reference.

A rank-one update of a matrix R yields a new matrix R', given by $$R' = R + \alpha e e^H \tag{7}$$

The square root M' of R' can be computed efficiently as an update to M, without requiring computations on R. One implementation of the root update is described in a paper by M. Seeger, "Low rank updates for the Cholesky decomposition," published by the Department of EECS, UC Berkeley, 2005, and incorporated herein by reference in its entirety. The root update procedure is summarized as a function RU with inputs M, e and $\alpha$, and output M':

$$M' = RU(M, e, \alpha) \tag{8}$$

Parallel Interference Cancellation Using Root Matrices

According to embodiments of the present invention, the interference data covariance matrices in a PIC system are replaced by their corresponding data covariance root matrices. This allows updates to the data covariance matrices to be modeled by rank-one updates to the data covariance root matrices, which are less computationally demanding, thus increasing PIC receiver performance. In particular, solving linear equation systems with root matrices reduces to simple back substitution operations. This greatly simplifies the GRAKE weight solution, as described in U.S. patent application Ser. No. 11/470,676, by A. Khayrallah, titled "Method for Covariance Matrix Update," published on Mar. 13, 2008 as 200810063033, and incorporated herein by reference in its entirety.

From the interference data covariance matrix update equation (2) and the outer product approximation to the reconstructed signal 0(4), $$Q_d^{(i)}(j) = R_d - \sum_{j' \in T^{(i)}(j)} \alpha(j') h^{(i-1)}(j') h^{(i-1)}(j')^H \quad (9)$$

The root of $R_d$ is denoted by M, and the root of $Q_d^{(i)}(j)$ by $N^{(i)}(j)$. Since each term in the sum is a rank-one update, then $N^{(i)}(j)$ can be found by a sequence of data covariance root matrix updates, starting from M. In particular, under the default assumption of (J–1) terms in the sum, then (J–1) applications of the function RU in equation (8) are necessary.

To provide an explicit example, without loss of generality, suppose that j=J. Then the sequence of applications of RU to start from M and end with $N^{(i)}(J)$ is as follows:

$$X^{(0)} = M$$

$$X^{(1)} = RU(X^{(0)}, h^{(i-1)}(J-1), -\alpha(1))$$

M $$X^{(J-1)} = RU(X^{(J-2)}, h^{(i-1)}(J-1), -\alpha(J-1))$$

$$N^{(i)}(J) = X^{(J-1)} \quad (10)$$

Note that the matrices $X^{(0)}, \ldots, X^{(J)}$ are temporary variables, shown for clarity only.

Figure 1:
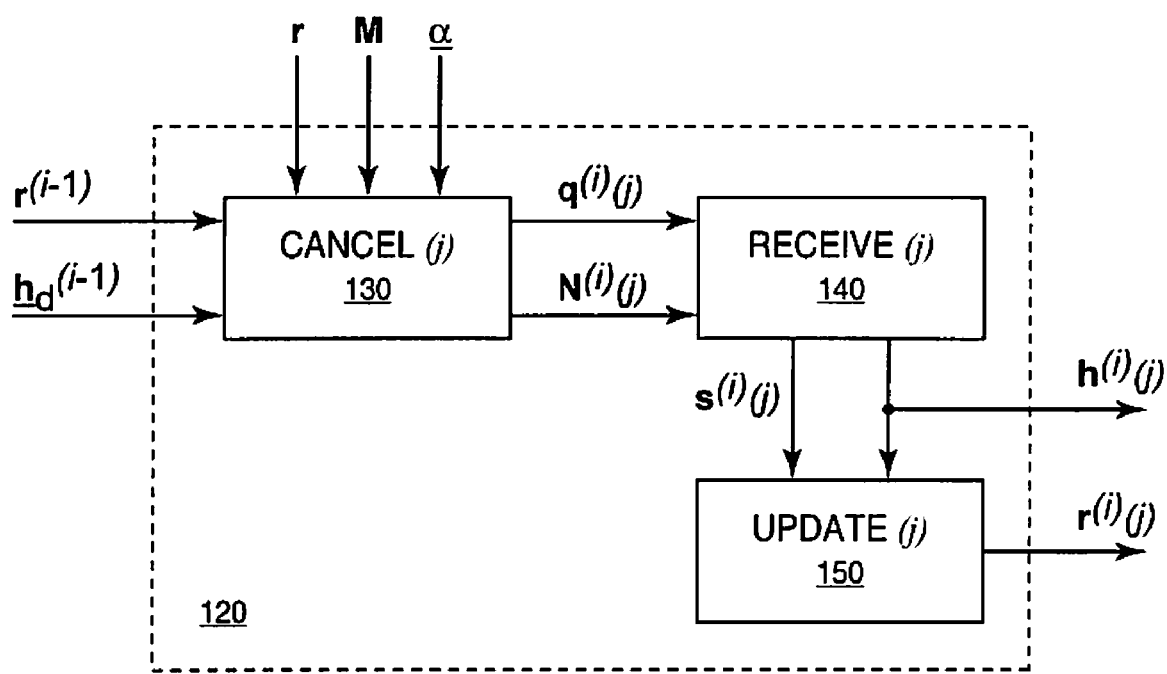
FIG. 1 is a functional block diagram of a PIC module using root matrices.
Figure 2:
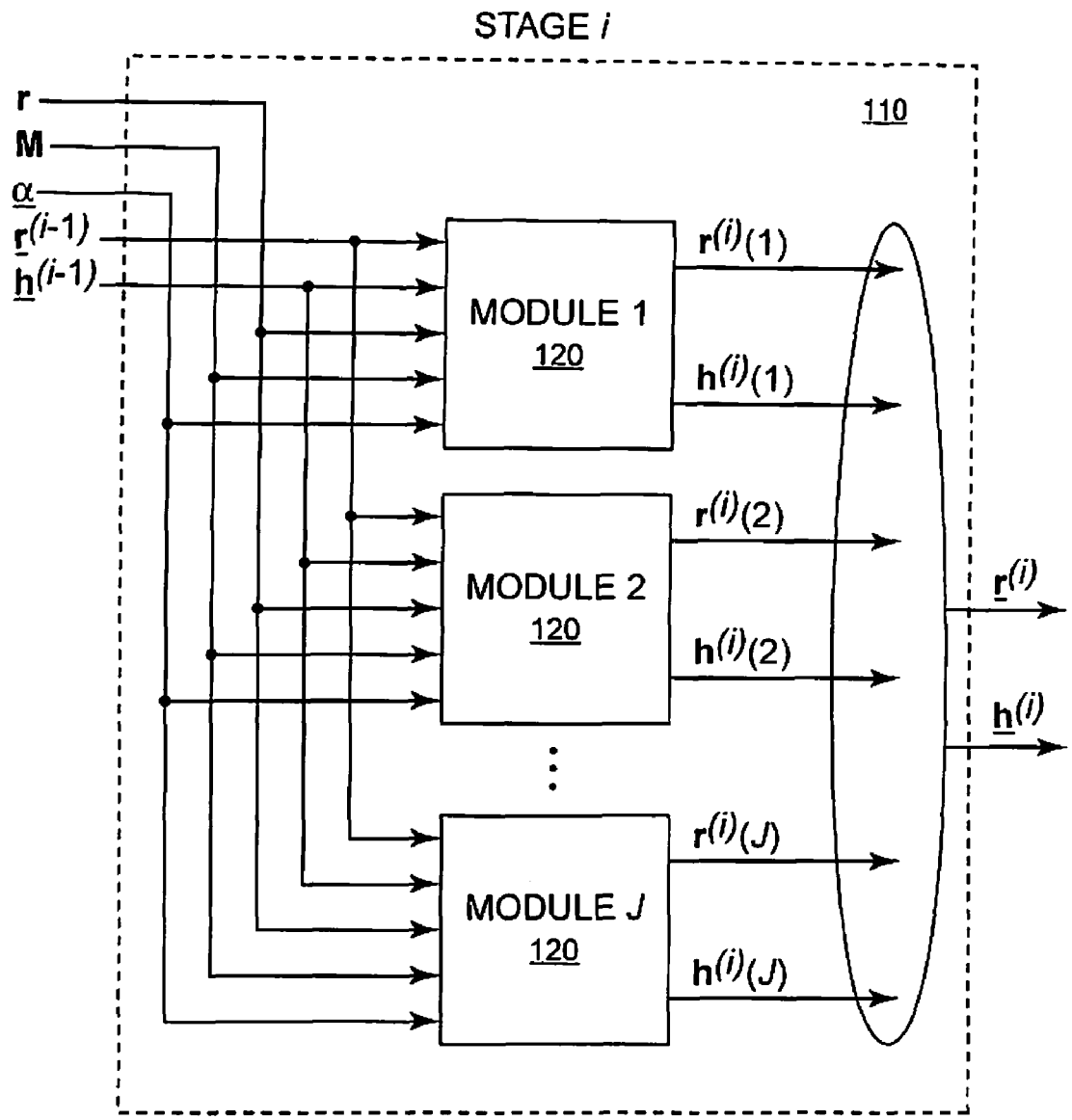
FIG. 2 is a functional block diagram of a PIC stage using root matrices.
Figure 3:
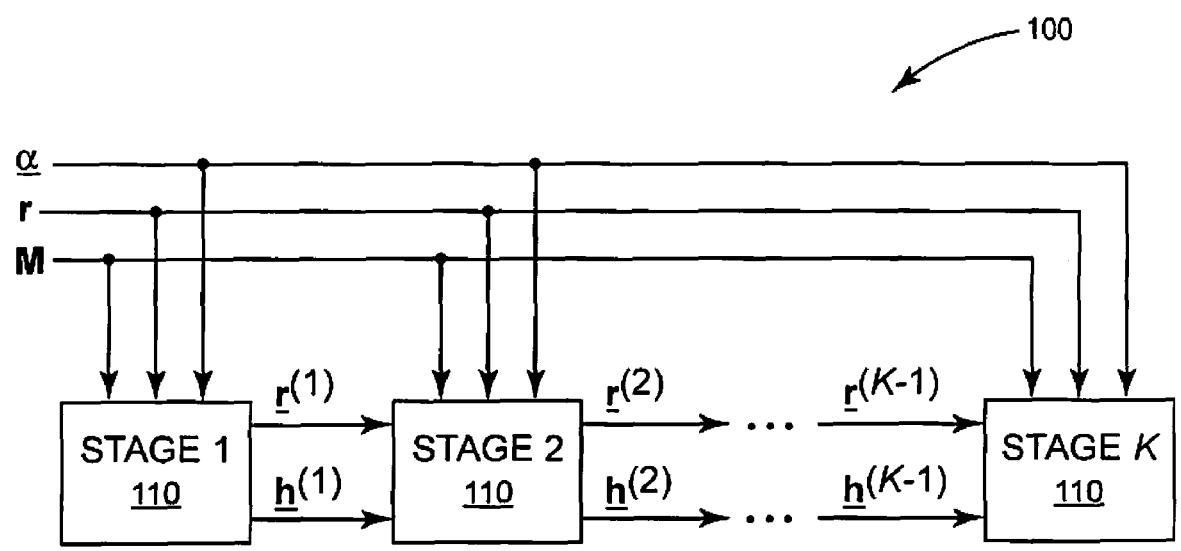
FIG. 3 is a functional block diagram of a PIC system using root matrices.

FIGS. 1-3 depict the details of a PIC system 100 utilizing data covariance root matrices. In particular, FIG. 1 depicts an individual module 120 for signal j at stage i. The group of channel estimates is denoted by $h^{(i)}$ and the group of scaling parameters by $\alpha$. The module 120 accepts the data covariance root matrix $\overline{M}$ instead of $R_d$. It also accepts $\alpha$. From stage (i–1), the module 120 accepts $h^{(i-1)}$ instead of $\overline{R}_d^{(i-1)}$. The cancellation block 130 feeds $N^{(i)}(j)$ instead of $Q^{(i)}(j)$ to the receive block 140. The receive block 140 can compute its GRAKE solution using $N^{(i)}(j)$. The update block 150 produces the reconstructed signal $r^{(i)}(j)$ only. The channel estimate $h^{(i)}(j)$ is output instead of $R_d^{(i)}(j)$.

The i-th stage 110, comprising parallel modules 120, is depicted in FIG. 2. FIG. 3 depicts the K stages 110 of the system 100.

Approximations to the Reconstructed Signal Data Covariance

The outer product equation (4) was assumed as the default approximation to the reconstructed data covariance matrix of equation (2). As described in the '145 application, outer product is merely the simplest of a number of increasingly precise approximations, which can be written as sums of outer products. It is thus possible to construct the corresponding data covariance root matrix using the appropriate sequence of RU updates. In some embodiments, these may be employed to construct a better approximation to the data covariance root matrix of one or more particular signals. For example, a dominant signal, whose interference to others is large enough to justify the extra work, may be a candidate for producing a better approximation.

Precomputing Common Terms

In one embodiment, a common adjusted signal and corresponding covariance information can be pre-computed. Then for each module 120, an additional adjustment may be made to obtain the desired input. The common signal is $$q^{(i)}(0) = r - \sum_{j' \in \{1, \ldots, J\}} r^{(i-1)}(j'). \quad (11)$$

The corresponding data covariance matrix is given by $$Q_d^{(i)}(0) = R_d - \sum_{j' \in \{1, \ldots, J\}} \alpha(j') R_d^{(i-1)}(j'). \quad (12)$$

Then for each individual signal, the following adjustment is made $$q^{(i)}(j) = q^{(i)}(0) + r^{(i-1)}(j) \quad (13)$$

and $$Q_d^{(i)}(j) = Q_d^{(i)}(0) + \alpha(j)(R_d^{(i-1)}(j)). \quad (14)$$

The impact on root domain updates must be considered. Referring to equation (9), (J–1) consecutive applications of RU are required to obtain $N^{(i)}(j)$. Thus, the total number of applications of RU per stage 110 is J(J–1)

The root of $Q_d^{(i)}(0)$ by is denoted by $N^{(i)}(0)$. Referring to equation (12), J consecutive applications of RU are required to obtain $N^{(i)}(0)$. Referring to equation (14), one additional application of RU is required to obtain $N^{(i)}(j)$. Thus, the total number of applications of RU per stage 110 is 2J.

Varying the Cancellation Set

In one embodiment, the cancellation set $T^{(i)}(j)$ for each signal may be varied, to account for one or more factors. One such factor is dominance of interference, wherein the cancellation set $T^{(i)}(j)$ may be restricted to the most dominant interferers. Another factor is quality, wherein the cancellation set $T^{(i)}(j)$ may be restricted to signals reconstructed with high quality. Still another such factor is delay, wherein the cancellation set $T^{(i)}(j)$ may be restricted to signals reconstructed within acceptable delays. The cancellation set $T^{(i)}(j)$ may also be varied over stages 110 in a pre-determined manner. For example, $T^{(i)}(j)$ may start small in early stages 110, and grow in successive stages 110 as reconstruction quality increases.

Varying the Number of Modules

In some embodiments, the number of modules 120 may vary over stages 110. For example, in early stages 110, modules 120 may be allocated to only the most dominant signals. Later stages 110 may include more modules 120, to reconstruct more signals. In general, smaller signals become more relevant as the larger signals are cancelled, and the reconstruction quality of the smaller signals improves.

In one embodiment, a module 120 may be included for signal $j_0$ at stage $i_0$ if the reconstructed signal $j_0$ is going to be cancelled in some module 120 at the immediate successor stage ($i_0$+1). That is, $j_0$ belongs to $T^{(i_0+1)}(j)$ for some j.

In one embodiment, the set of modules 120 at each stage 110 is determined beforehand, using initial estimates of the received power of the signals, their SNR, their margin over a nominal SNR, or other measure of signal strength and/or quality. In another embodiment, an initial decision is made concerning the number of modules 120 at each stage 110. However, this initial decision may be refined later in intermediate stages 110. For example, if the initial decision was to include a module for signal $j_0$ at stage $i_0$, but the signal reconstruction is of low quality, then $j_0$ may be dropped. In addition, consider some other signal $j_1$ that was marginal and initially left out of stage $i_0$. A module 120 for $j_1$ may then be introduced into stage $i_0$.

Halting the Processing of a Signal

In one embodiment, the processing of some signals halts once their demodulation and reconstruction reaches a predetermined quality level. If a signal is demodulated and reconstructed with sufficient quality, there is little value added in processing it further. The signal may thus be removed permanently from the received signal. In one embodiment, the decision to stop processing the signal may also be aided by decoding and a CRC check.

For example, suppose signal $j_0$ is chosen to be removed permanently after stage $i_0$. Then following stage $i_0$, the received signal r is replaced with $$r' = r - r^{(i_0)}(j_0) \quad (15)$$

and its corresponding data covariance matrix is replaced with $$R'_d = R_d - \alpha(j_0) R_d^{(i_0)}(j_0). \quad (16)$$

In the root domain, the matrix M' corresponding to $R'_d$ is given by $$M' = RU((M, h^{(i_0)}(j_0), -\alpha(j_0)). \quad (17)$$

Figure 4:
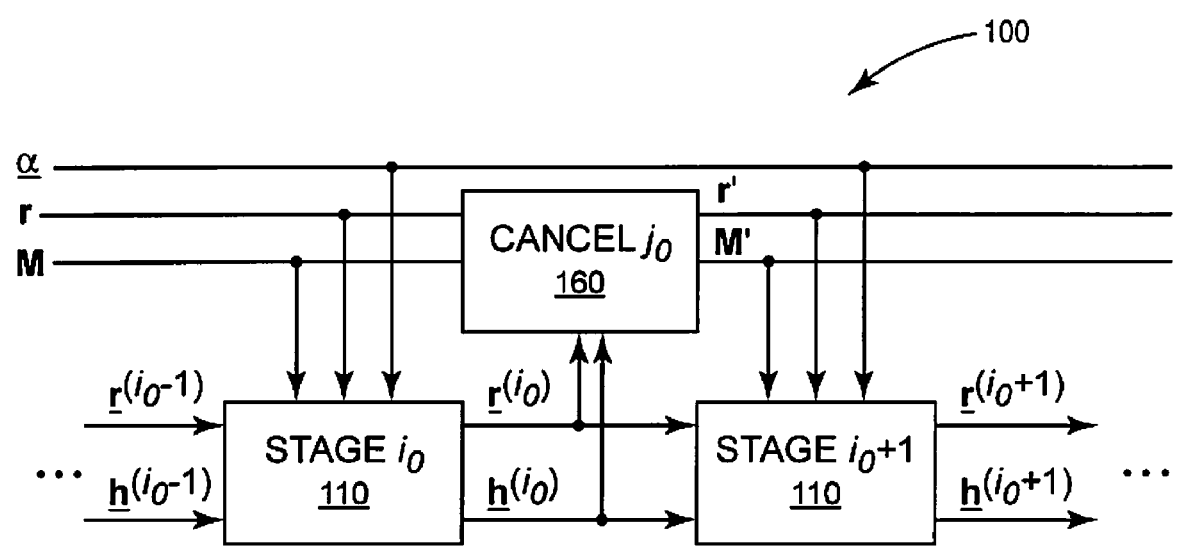
FIG. 4 is a functional block diagram of a PIC system with a cancel block.

Also, for all subsequent stages $i > i_0$, $j_0$ is removed from the sets $T^{(i)}(j)$, wherever it is present. FIG. 4 depicts the permanent removal of signal $j_0$ from the serial structure after stage $i_0$, with a cancellation block 160 to replace r and M with r' and M', respectively.

Parameter Estimation After Signal Demodulation

In one embodiment, parameters such as channel estimates and correlations can be improved post-demodulation. The default PIC system 100 assumes a standard parameter estimation method using pilot symbols. Parameter estimation may be further refined with an additional block after demodulation. That is, the reconstructed symbols, possibly aided by decoding, may be used as effective additional pilots for a second parameter estimation. This may help improve the quality of cancellation in the next stage 110.

Multi-Pass Demodulation

In one embodiment, the performance of the receive block 140 may be improved by providing feedback from the decoder to the demodulator, and iterating the process, in what is known as multi-pass demodulation, or turbo demodulation. This may also involve the improved parameter estimation described above.

Halting Parameter Estimation

In one embodiment, parameter estimation is halted after a number of stages if the quality of the estimates is deemed to be sufficient. The estimated parameters can be used in subsequent stages 110. For example, if for stage $i_0$ and signal $j_0$ the channel estimate $h^{(i_0)}(j_0)$ is good enough, then channel estimation may be skipped in subsequent stages $i > i_0$, and set $$h^{(i)}(j_0) = h^{(i_0)}(j_0). \quad (18)$$

The demodulation, decoding, and reconstruction may occur in later stages $i > i_0$ to produce $r^{(i)}(j_0)$ using $h^{i_0}(j_0)$.

Soft Signal Reconstruction

In one embodiment, a soft signal reconstruction may be utilized. In particular, soft information from the demodulator or the decoder can be used in the signal reconstruction and subtraction. Soft information about the modem bits may be obtained from the demodulator or the decoder. Typically, the soft information is in the form of log-likelihood ratio (LLR) or an approximation thereof. Those LLR's can be transformed into modem bit probabilities, which in turn can be transformed into symbol probabilities. The expected value of the symbol can be computed from the symbol values and the symbol probabilities. This expected value is used as the "soft symbol." The soft symbol is multiplied by the spreading sequence to produce a "soft signal" to be used in the subtraction step.

Disallowing Cancellation of a Signal

In one embodiment, the use of a reconstructed signal may be disallowed for cancellation in the next stage, if the signal quality is deemed insufficient. For example, the decision may be based on the appropriate metrics out of the demodulator or the decoder, or a failed CRC check.

Pass-Through Module

In general, a module 120 for signal $j_0$ is included at stage $i_0$ if the reconstructed signal $j_0$ is going to be cancelled in some module 120 at stage ($i_0+1$). In one embodiment, this rule may be broken. For example, suppose that $j_0$ is reconstructed with high quality at stage $i_0$, but it is small compared to other signals being cancelled at stage ($i_0+1$), so it is not used. Also, suppose that after stage ($i_0+1$), one or more large signals are permanently removed, making signal $j_0$ a viable cancellation candidate at stages $i > (i_0+1)$. Since signal $j_0$ was reconstructed well enough at stage $i_0$, there is no need to reconstruct it again.

This can be represented within the PIC structure 100 by a simplified pass-through module $j_0$ at stage ($i_0+1$) (and possibly other intermediate stages). The pass-through module simply outputs the vectors $r^{(i_0)}(j_0)$ and $h^{(i_0)}(j_0)$ computed in stage $i_0$.

Further, recall the case where for stage $i_0$ and signal $j_0$, the channel estimate $h^{(i_0)}(j_0)$ is reconstructed with sufficient quality, and for $i > i_0$, $h^{(i)}(j_0) = h^{(i_0)}(j_0)$. This may be implemented as a (partial) pass-through module. At stage ($i_0+1$) and beyond, module $j_0$ passes through $h^{(i_0)}(j_0)$, while it still completes other operations, including demodulation.

Misaliqned Slots

Signal slots may be misaligned as signals reach a receiver. In one embodiment, the effect of misaligned slots is reflected in individual modules 120. Consider an individual module 120 for signal j at stage i, and assume that additional information about the timing of each signal (when it starts and when it ends) is available to the module 120. The processing window is made larger than the duration of signal j. The window size is a design parameter. The window is quantized into a number Y of subintervals, and the timing of the signals in $T^{(i)}(j)$ is quantized accordingly. For each subinterval, the module 120 determines which signals from $T^{(i)}(j)$ are present. It continues with the cancellation block 130 and demodulation in the receive block 140 accordingly. That is, for each subinterval, the cancellation block 130 cancels the signals present, and updates the root matrix. Then the receive block 140 computes a GRAKE solution and demodulates the signal. Thus in a baseline implementation, there are Y separate cancellation and receive blocks (or equivalently, Y repeated uses of the cancellation and receive blocks) 130, 140.

In one embodiment, complexity can be reduced if the module 120 recognizes that the same signals are present in a number of sub-intervals. This knowledge can be exploited to reduce the number of separate cancellation and receive blocks 130, 140.

Other Demodulation Methods

The GRAKE receiver is a linear receiver that exploits covariance information. Other methods that exploit the covariance include the Maximum Likelihood Sequence Estimation (MLSE), Maximum-A-Posteriori (MAP), Decision-Feedback Sequence Estimation (DFSE) and Decision Feedback Equalization (DFE). In various embodiments, these demodulation methods may be employed in the PIC system 100 described herein.

Stages, Modules, and Functions

Those of skill in the art will recognize that the inventive PIC system is described functionally herein, and that such functional description, or depiction in the drawing figures, is representative only and does not imply any particular structure. For example, each stage 110 is described as successively refining signals based on calculations and computations performed in a preceding stage 110. In any particular implementation, the stages 110 (whether implemented in hardware or software) may be arranged serially, as depicted in FIG. 3. Alternatively, one or more stages 110 may be provided, with each successive iteration comprising passing data back through one or more stages 110 two or more times. Each stage 110 may be implemented as a hardware module, as firmware executing on programmable or configurable logic, or as a software routine executing on a processor, such as a Digital Signal Processor (DSP), or any combination thereof. Similarly, the modules 120 may be implemented by any combination of hardware, firmware, or software, as known in the art. The cancel function 130, receive function 140, and update function 150 of each module 120 are described functionally. In a given implementation, the cancel, receive, and update functions 130, 140, 150 may be merged, combined, or subdivided as desired or required according to system constraints, such as available computational power, power consumption, weight, speed, and the like.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of Parallel Interference Cancellation, comprising the steps of:
    receiving a total received signal comprising time samples from one or more receive antennas;
    receiving a data covariance matrix representing covariance properties between samples from different time delays and/or from different antennas;
    calculating a root matrix of the data covariance matrix and a scalar value; and
    in a series of successive stages, calculating a total reconstructed signal and a channel estimate based on the total received signal, the root matrix, and the scalar value, and,
    except for a first stage of the successive stages, the total reconstructed signal, and the channel estimates from an immediate prior stage of the series of successive stages;
    wherein each stage comprises one or more parallel modules,
    each module operative to reconstruct an individual signal and a channel estimate for a different individual signal in the total reconstructed signal, based on a demodulation and the channel estimation of all received signals provided by the immediate prior stage;
    wherein each module comprises:
    a cancel function operative to cancel the reconstructed signals in a cancellation set from the total received signal to isolate a desired signal, and to adjust the root matrix of the data covariance matrix with corrections for the signals in the cancellation set to isolate a desired covariance information;
    a receive function operative to compute and output channel estimates for a desired signal based on the isolated desired signal and isolated covariance data information and to demodulate symbols in the desired signal; and
    an update function operative to output the reconstructed signal based on the demodulated symbols.

2. The method of claim 1 wherein calculating the root matrix of the data covariance matrix comprises performing a Cholesky decomposition of the data covariance matrix.

3. The method of claim 1 wherein adjusting the root matrix of the data covariance matrix with corrections for the received signals in a cancellation set to isolate desired covariance information comprises performing a series of root updates to the root matrix of the data covariance matrix.

4. The method of claim 1 wherein the cancellation set of the reconstructed signals in the cancellation set comprises all previously calculated reconstructed signals.

5. The method of claim 1 wherein the cancellation set of the reconstructed signals in the cancellation set based on one of dominance, quality, and delay.

6. The method of claim 1 wherein the cancellation set of the reconstructed signals in the cancellation set varies over stages in a predetermined manner.

7. The method of claim 1 wherein a number of modules per stage varies over stages in a predetermined manner.

8. The method of claim 7 wherein the module for the desired signal is included in the stage only if the desired signal is the cancellation set of an immediately succeeding stage.

9. The method of claim 1 further comprising halting the processing of a given signal when the given signal quality exceeds a predetermined threshold.

10. The method of claim 1 wherein the update function is further operative to calculate channel estimates after demodulation.

11. The method of claim 1 wherein the receive function employs multi-pass demodulation by feeding data back from a decoder to the demodulator.

12. The method of claim 1 further comprising halting a processing of a given channel estimate, and using the last calculated value in all further downstream calculations.

13. The method of claim 1 wherein the receive function utilizes soft bit information from the demodulator or a decoder in signal reconstruction and subtraction.

14. The method of claim 1 further comprising disallowing a use of a reconstructed signal for downstream cancellation if the received signal quality falls below a predetermined threshold.

15. The method of claim 1 wherein one or more modules in one or more stages comprises a pass-through module, in which one of a desired reconstructed signal or a channel estimates are output as input, with no processing within the module.

16. The method of claim 1 wherein receiving the total received signal comprises receiving signals that are not slot-aligned, and wherein calculating the total reconstructed signal comprises, for each component signal, the steps of:
    acquiring information related to the received signal timing;
    defining a processing window larger that a duration of the received signal;
    quantizing the processing window into a plurality of subintervals; and
    for each subinterval,
    determining which received signals in the cancellation set are present in the total received signal; and
    cancelling the received signals in the cancellation set that are present in the subinterval.

17. A Parallel Interference Cancellation system that receives a total received signal r comprising time samples from one or more receive antennas and a data covariance matrix $R_d$ representing covariance properties between samples from different time delays and/or from different antennas, the system comprising

- a signal processor controlled by instructions in a memory to be operative to cancel interference in one or more individual signals r(j) of the total received signal r, in
- a series of k successive stages, an i-th stage calculating a reconstructed total signal $r^i$ and channel estimates $h^i$ based on r, a root matrix M of $R_d$, a scalar value α, and, except for a first stage of the series of k successive stages, a reconstructed signal $r^{i-1}$ and a channel estimate $h^{i-1}$ from an immediate prior stage of the series of k successive stages;
- wherein each stage i comprises j parallel modules, each module operative to reconstruct an individual signal $r^i(j)$ and a channel estimate $h^i(j)$ for a different individual signal in r, based on r, M, α, $r^{i-1}$, $h^{i-1}$, and wherein the i-th stage outputs $r^i$ and $h^i$ comprise the sum of $r^i(j)$ and $h^i(j)$ from all j modules;
- wherein each module comprises:
  - a cancel function operative to cancel the other reconstructed signals in a cancellation set from the total received signal r to isolate a desired signal $q^i(j)$ and to adjust the data covariance root matrix $N^i(j)$ with corrections for the signals in a cancellation set to isolate desired covariance information;
  - a receive function operative to demodulate desired symbols $s^i(j)$ from $q^i(j)$ using $N^i(j)$ and to output updated channel estimates $h^i(j)$ and
  - an update function operative to update and output the desired reconstructed signal $r^i(j)$ based on $s^i(j)$ and $h^i(j)$.

18. The system of claim 17 wherein the root matrix M is obtained by performing a Cholesky decomposition of the data covariance matrix Rd.

19. The system of claim 17 wherein all the cancellation functions of corresponding modules in all stages utilize a precomputed common signal $$q^{(i)}(0) = r - \sum_{j' \in \{1,\ldots,J\}} r^{(i-1)}(j'),$$

wherein J is the total number of root matrix updates $$Q_d^{(i)}(0) = R_d - \sum_{j' \in \{1,\ldots,J\}} \alpha(j') R_d^{(i-1)}(j'),$$

wherein a(j) is the scaling value of the jth module.

20. The system of claim 17 wherein the cancellation functions calculate the adjustments $$q^{(i)}(j) = q^{(i)}(0) + r^{(i-1)}(j) \tag{13}$$

and $$Q_d^{(i)}(j) = Q_d^{(i)}(0) + \alpha(j) R_d^{(i-1)}(j),$$

wherein a(j) is the scaling value of the jth module.

21. The system of claim 17 wherein the total number of root matrix updates to obtain the data covariance root matrices $N^{(i)}(j)$ for a stage comprising modules is 2J, wherein J is the total number of root matrix updates.

* * * * *

UNITED STATES PATENT AND TRADEMARK OFFICE
CERTIFICATE OF CORRECTION

PATENT NO. : 8,270,453 B2
APPLICATION NO. : 12/263712
DATED : September 18, 2012
INVENTOR(S) : Khayrallah et al.

It is certified that error appears in the above-identified patent and that said Letters Patent is hereby corrected as shown below:

In Column 3, Line 10, delete "stage" and insert -- stage i --, therefor.

In Column 3, Line 18, delete "covadance" and insert -- covariance --, therefor.

In Column 4, Line 18, delete "Cova dance" and insert -- Covariance --, therefor.

In Column 4, Line 39, delete "H" and insert -- H. --, therefor.

In Column 6, Line 27, delete "J(J-1)" and insert -- J(J-1). --, therefor.

In Column 7, Line 23, in Equation (17), delete "M'=RU((" and insert -- M'=RU( --, therefor.

In Column 7, Line 57, delete " $h^{i_0)}$ " and insert -- $h^{(i_0)}$ --, therefor.

In Column 7, Line 62, delete "modern" and insert -- modem --, therefor.

In Column 7, Line 66, delete "modern" and insert -- modem --, therefor.

In Column 8, Line 30, delete " $h^{(i_0)}$ " and insert -- $h^{(i_0)}$ --, therefor.

In Column 8, Line 34, delete "Misaliqned" and insert -- Misaligned --, therefor.

In Column 9, Line 56, in Claim 1, delete "reconstructed" and insert -- received --, therefor.

In Column 9, Line 58, in Claim 1, delete "immediate" and insert -- immediately --, therefor.

In Column 10, Line 1, in Claim 1, delete "information" and insert -- information, --, therefor.

In Column 10, Line 17, in Claim 5, delete "set" and insert -- set is varied --, therefor.

Signed and Sealed this
Eleventh Day of December, 2012

David J. Kappos
*Director of the United States Patent and Trademark Office*

CERTIFICATE OF CORRECTION (continued)
U.S. Pat. No. 8,270,453 B2

In Column 10, Line 26, in Claim 8, delete "is" and insert -- is in --, therefor.

In Column 10, Line 56, in Claim 16, delete "that" and insert -- than --, therefor.

In Column 11, Line 3, in Claim 17, delete "comprising" and insert -- comprising: --, therefor.

In Column 11, Line 18, in Claim 17, delete "$h^{i-1}$" and insert -- and $h^{i-1}$ --, therefor.

In Column 12, Line 3, in Claim 18, delete "Rd." and insert -- $R_d$. --, therefor.

In Column 12, Line 13, in Claim 19, after "updates" insert -- and precomputed common data covariance matrix --.

In Column 12, Line 20, in Claim 19, delete "a(j)" and insert -- $\alpha(j)$ --, therefor.

In Column 12, Line 28, in Claim 20, delete "a(j)" and insert -- $\alpha(j)$ --, therefor.

In Column 12, Line 30, in Claim 21, delete "comprising" and insert -- comprising J --, therefor.